US010609638B2

(12) United States Patent
Kurihara (10) Patent No.: US 10,609,638 B2
(45) Date of Patent: Mar. 31, 2020

(54) METHOD OF DELETING SSID OF ACCESS POINT STORED IN INFORMATION PROCESSING APPARATUS

(71) Applicant: CANON KABUSHIKI KAISHA, Tokyo (JP)

(72) Inventor: Shukei Kurihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 15/220,040

(22) Filed: Jul. 26, 2016

(65) Prior Publication Data
US 2017/0048696 A1   Feb. 16, 2017

(30) Foreign Application Priority Data

Aug. 10, 2015  (JP) .................... 2015-158500

(51) Int. Cl.
*H04W 48/20* (2009.01)
*G06F 3/12* (2006.01)
*H04W 84/12* (2009.01)
*H04W 8/18* (2009.01)

(52) U.S. Cl.
CPC .......... *H04W 48/20* (2013.01); *G06F 3/1204* (2013.01); *G06F 3/1236* (2013.01); *G06F 3/1292* (2013.01); *H04W 8/18* (2013.01); *H04W 84/12* (2013.01)

(58) Field of Classification Search
CPC ....... H04W 48/20; H04W 84/12; H04W 8/18; G06F 3/1236; G06F 3/1204; G06F 3/1292; G06F 3/1296; G06F 3/1282; G05B 2219/45187; G05B 2219/45188; H04L 12/40123
See application file for complete search history.

(56) References Cited

U.S. PATENT DOCUMENTS

| 9,292,233 B2 | 3/2016 | Kurihara | 358/1.15 |
| 9,313,693 B2 | 4/2016 | Amano | 455/41.1 |
| 2006/0135068 A1* | 6/2006 | Jaakkola | H04W 48/16 455/41.2 |
| 2011/0314409 A1* | 12/2011 | Yano | G06F 9/4445 715/778 |

(Continued)

FOREIGN PATENT DOCUMENTS

| CN | 101578900 A | 11/2009 |
| CN | 102740500 A | 10/2012 |

(Continued)

OTHER PUBLICATIONS

Chinese Office Action issued in corresponding Chinese Application No. 201610633116.8 dated Aug. 1, 2019.

*Primary Examiner* — Ian N Moore
*Assistant Examiner* — Justin T Van Roie
(74) *Attorney, Agent, or Firm* — Venable LLP (57) ABSTRACT

In a method, that is executed in an information processing apparatus, of deleting an SSID (Service Set Identifier) of an access point stored in the information processing apparatus, information indicating SSIDs stored in the information processing apparatus is obtained from the information processing apparatus, and an SSID satisfying a predetermined condition is specified among the SSIDs included in the obtained information. The information processing apparatus is instructed to delete the specified SSID.

10 Claims, 11 Drawing Sheets

(56) References Cited

U.S. PATENT DOCUMENTS

| | | | |
|---|---|---|---|
| 2012/0250577 A1* | 10/2012 | Kimura | H04L 63/0869 370/254 |
| 2014/0200034 A1* | 7/2014 | Lee | G01S 5/02 455/456.3 |
| 2015/0117210 A1* | 4/2015 | Yang | H04W 24/02 370/235 |
| 2016/0165075 A1 | 6/2016 | Kurihara | 358/1.15 |
| 2016/0295546 A1* | 10/2016 | Yumura | H04W 64/00 |
| 2017/0026936 A1* | 1/2017 | Jiang | H04W 28/16 |

FOREIGN PATENT DOCUMENTS

| | | |
|---|---|---|
| EP | 2903320 A1 | 8/2015 |
| JP | 2013-157736 A | 8/2013 |

\* cited by examiner

METHOD OF DELETING SSID OF ACCESS POINT STORED IN INFORMATION PROCESSING APPARATUS

BACKGROUND OF THE INVENTION

Field of the Invention

The present invention relates to a method of deleting an SSID (Service Set Identifier) of an access point stored in an information processing apparatus.

Description of the Related Art

In recent years, a mobile terminal called a smartphone, a tablet PC, or the like has a wireless communication function, and can transmit, using the wireless communication function, a photo or document data stored in the mobile terminal to a printing apparatus such as a printer to print it.

In order for the mobile terminal to execute wireless communication with an apparatus such as a printer, the mobile terminal needs to establish wireless communication with the printing apparatus by performing connection to, for example, an access point. As a method of establishing wireless communication, a handover using NFC (Near Field Communication) is known (see Japanese Patent Laid-Open No. 2013-157736). The handover is processing of obtaining, using near field wireless communication such as NFC, connection information (for example, an SSID (Service Set Identifier)) necessary to execute wireless communication, and establishing wireless communication based on the obtained connection information. This handover allows a user of a mobile terminal to establish wireless communication between the mobile terminal and an external apparatus such as a printer by only bringing the mobile terminal closer to the external apparatus (touching the external apparatus with the mobile terminal).

Some external apparatuses behave (act) as access points. It is also possible to establish direct wireless communication between such external apparatus and a mobile terminal. In this arrangement, it is possible to implement the above-described handover.

The mobile terminal stores connection information which has been used to establish wireless communication. This enables the mobile terminal to be reconnected to the access point which has been connected before, thereby improving the user convenience.

The above-described handover is performed to temporarily establish wireless communication between the mobile terminal and the external apparatus. Since the mobile terminal can be reconnected to the access point which has been connected before, the external apparatus may randomly change the SSID every connection operation. This can prevent a situation in which even though a user of a given mobile terminal is attempting to perform connection to an external apparatus, another mobile terminal which has been connected to the external apparatus once is connected to the external apparatus first. On the other hand, since the mobile terminal stores a randomly generated SSID every time it is connected to an external apparatus, a large number of SSIDs may be displayed on the SSID selection screen of the mobile terminal. In this case, the user of the mobile terminal needs to find a desired SSID from a list of the large number of SSIDs. This is cumbersome for the user.

SUMMARY OF THE INVENTION

An aspect of the present invention is to eliminate the above-mentioned problems with the conventional techniques.

A feature of the present invention is to solve the above problem in the related art by deleting an SSID satisfying a predetermined condition from the SSIDs of access points stored in an information processing apparatus.

According to a first aspect of the present invention, there is provided a method, that is executed in an information processing apparatus, of deleting an SSID (Service Set Identifier) of an access point stored in the information processing apparatus, comprising: obtaining, from the information processing apparatus, information indicating SSIDs stored in the information processing apparatus; specifying an SSID satisfying a predetermined condition among the SSIDs included in the information obtained in the obtaining; and instructing the information processing apparatus to delete the SSID specified in the specifying.

According to a second aspect of the present invention, there is provided a method, that is executed in an information processing apparatus, of deleting an SSID of an access point stored in the information processing apparatus, comprising: obtaining first information indicating SSIDs stored in the information processing apparatus from the information processing apparatus; specifying SSIDs each including a predetermined character string among the SSIDs indicated by the first information; obtaining second information indicating an SSID of an access point currently connected to the information processing apparatus from the information processing apparatus; and instructing the information processing apparatus to delete SSIDs except for the SSID indicated by the second information among the SSIDs specified in the specifying and each including the predetermined character string.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
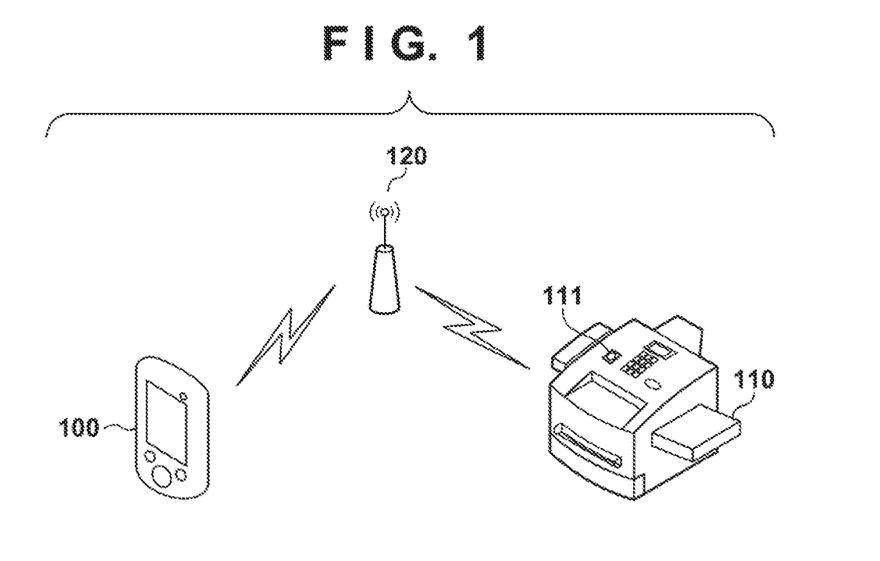
FIG. 1 depicts a view for explaining the configuration of a communication system according to a first embodiment of the present invention.

FIG. 1 depicts a view for explaining the configuration of a communication system according to the first embodiment of the present invention.

The communication system according to the first embodiment includes a mobile terminal 100, a printing apparatus 110, an NFC tag 111 provided in the printing apparatus 110, and an access point 120. Note that the printing apparatus 110 may operate as an access point by software, and execute wireless communication such as a wireless communication LAN with the mobile terminal 100.

The mobile terminal 100 can execute wireless communication such as a wireless communication LAN. When the user inputs the SSID and security key of the printing apparatus 110 to the mobile terminal 100, the mobile terminal 100 can be connected to the printing apparatus 110, and communicate with the printing apparatus 110 via the wireless communication LAN. Thus, the mobile terminal 100 can transmit a print job to an external apparatus such as the printing apparatus 110 via the wireless communication LAN. Upon receiving the print job, the printing apparatus 110 executes printing in accordance with the print job.

The mobile terminal 100 and the printing apparatus 110 can execute near field wireless communication such as NFC. In the first embodiment, the printing apparatus 110 has the NFC tag 111 in which connection information (the SSID and security key of the access point 120) for connection to the access point 120 is stored. The mobile terminal 100 can obtain the information of the NFC tag 111 of the printing apparatus 110 using NFC, and can be connected to the access point 120 based on the obtained information. The processing of switching connection to wireless communication such as a wireless communication LAN using the information obtained by the near field wireless communication such as NFC is called a handover. The handover can omit the user's labor for inputting, to the mobile terminal 100, the information (the SSID and security key of the access point 120) for connection to the access point 120.

Figure 7:
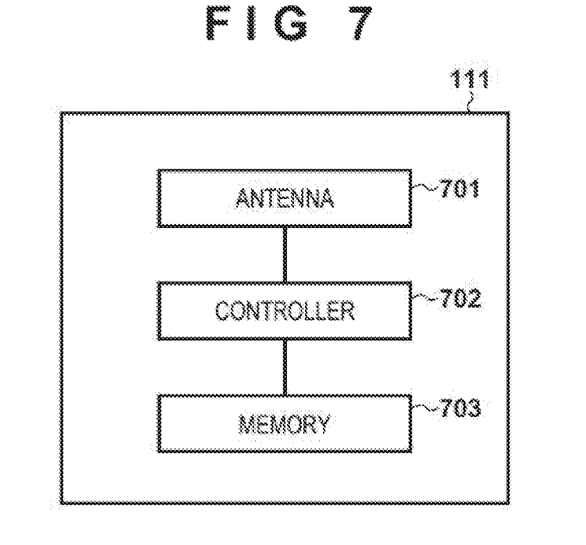
FIG. 7 is a block diagram for explaining the hardware arrangement of an NFC tag according to the first embodiment.

FIG. 7 is a block diagram for explaining the hardware arrangement of the NFC tag 111 according to the first embodiment.

Figure 2:
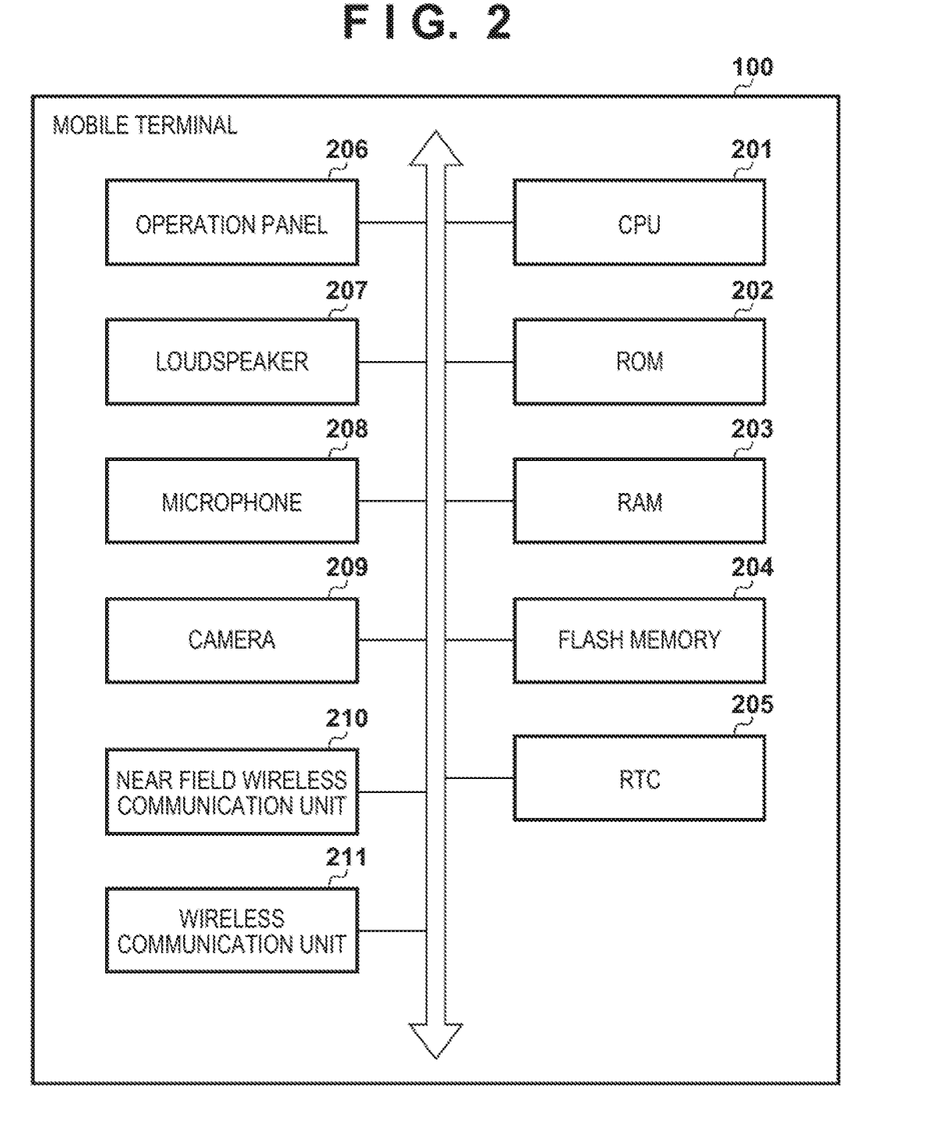
FIG. 2 is a block diagram for explaining the hardware arrangement of a mobile terminal according to the first embodiment.

An antenna 701 is connected to a controller 702. The antenna 701 is supplied with an electric power from a near field wireless communication unit 210 (FIG. 2) of the mobile terminal 100 by electromagnetic induction, and uses the electric power as the operating power of the controller 702. In addition, the antenna 701 operates as an antenna for wireless communication from a near field wireless communication unit 210 (FIG. 2). The controller 702 communicates with the mobile terminal 100 via the antenna 701. In addition, the controller 702 performs processing of reading/writing a read/write instruction by communication from/in a memory 703. This makes it possible to hold the information (to be described later) of the printing apparatus 110 such as a MAC address, and externally send the information via the antenna 701, as needed.

FIG. 2 is a block diagram for explaining the hardware arrangement of the mobile terminal 100 according to the first embodiment. Note that, for example, an apparatus such as a smartphone or tablet PC is assumed as the mobile terminal 100 according to the first embodiment. However, any other information processing apparatus capable of executing wireless communication may be used.

A CPU 201 deploys, in a RAM 203, a control program stored in a ROM 202 or a flash memory 204, and executes it, thereby executing various processes for controlling the operation of the mobile terminal 100. The ROM 202 stores the control program. The RAM 203 is used as a main memory and a temporary storage area such as a work area for the CPU 201. The flash memory 204 stores various data such as photos and electronic documents. Furthermore, the flash memory 204 stores an OS (Operation System) 310 (FIG. 3) and a print application 300 (FIG. 3) (both will be described later). An RTC (Real Time Clock) 205 measures a time instructed by the CPU 201 and the current time.

Note that in the mobile terminal 100 in this example, the one CPU 201 executes respective processes shown in flowcharts (to be described later). Another arrangement may be adopted. For example, a plurality of CPUs may cooperate with each other to execute the respective processes shown in the flowcharts (to be described alter).

An operation panel 206 has a touch panel function capable of detecting a touch operation by the user. The operation panel 206 displays various screens provided by the OS 310 and the print application 300. The user can input a desired operation instruction to the mobile terminal 100 by inputting a touch operation to the operation panel 206. The mobile terminal 100 includes hardware keys (not shown), and the user can input an operation instruction to the mobile terminal 100 using the hardware keys.

A loudspeaker 207 and a microphone 208 are used when the user calls another mobile terminal (mobile phone) or fixed-line phone. A camera 209 captures an image in response to an image capturing instruction from the user. Photo data captured by the camera 209 is stored in a predetermined area of the flash memory 204.

The near field wireless communication unit 210 executes near field wireless communication such as NFC. In the first embodiment, the printing apparatus 110 includes the NFC tag 111. When the user brings the mobile terminal 100 closer to the NFC tag 111 of the printing apparatus 110, near field wireless communication is established between the near field wireless communication unit 210 and the NFC tag 111 of the printing apparatus 110, and the near field wireless communication unit 210 obtains the information of the NFC tag 111. Note that near field wireless communication executed by the near field wireless communication unit 210 is not limited to NFC, and may be, for example, Bluetooth®.

A wireless communication unit 211 executes wireless communication via a wireless communication LAN or the like. By using the handover, the mobile terminal 100 can implement wireless communication by the wireless communication unit 211 with a simple operation for the user. More specifically, using the connection information (the SSID and security key of the access point 120) obtained by the near field wireless communication unit 210 from the NFC tag 111 of the printing apparatus 110, the wireless communication unit 211 can perform connection to the access point 120. The wireless communication unit 211 can communicate, via the access point 120, with an apparatus connected to the access point 120.

Figure 3:
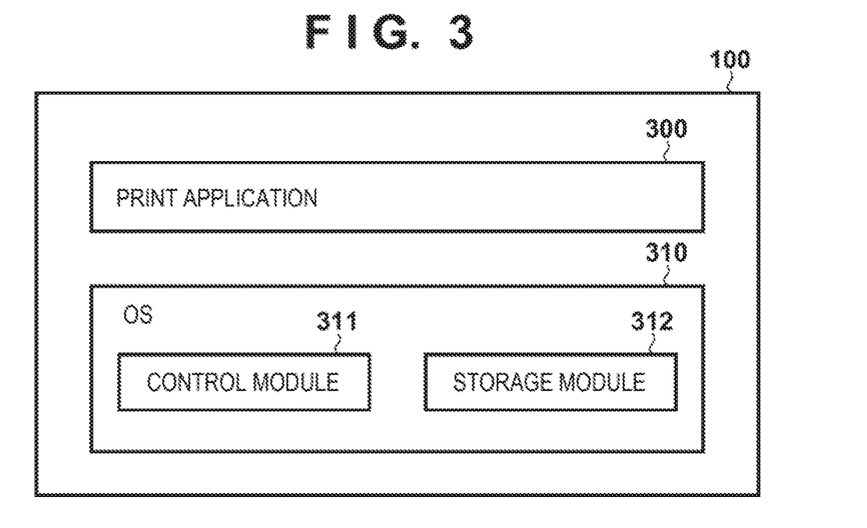
FIG. 3 is a block diagram for explaining the software arrangement of the mobile terminal according to the first embodiment.

FIG. 3 is a block diagram for explaining the software arrangement of the mobile terminal 100 according to the first embodiment. Software programs shown in FIG. 3 indicate software functions implemented when the CPU 201 deploys control programs stored in the ROM 202 or the flash memory 204 into the RAM 203 and executes them.

The OS 310 is software for controlling the overall operation of the mobile terminal 100. A control module 311 controls the overall operation of the OS 310. Various applications including the print application 300 (to be described later) can be installed in the mobile terminal 100. The control module 311 exchanges information with each application. In accordance with an instruction received from the application, the control module 311 changes a screen displayed on the operation panel 206, and executes wireless communication by the wireless communication unit 211.

Screen transition and an overview of a print function implemented by the print application 300 will be described with reference to FIGS. 6A to 6C. Respective screens shown in FIGS. 6A to 6C are screen examples displayed on the operation panel 206 by the print application 300.

Figure 6A:
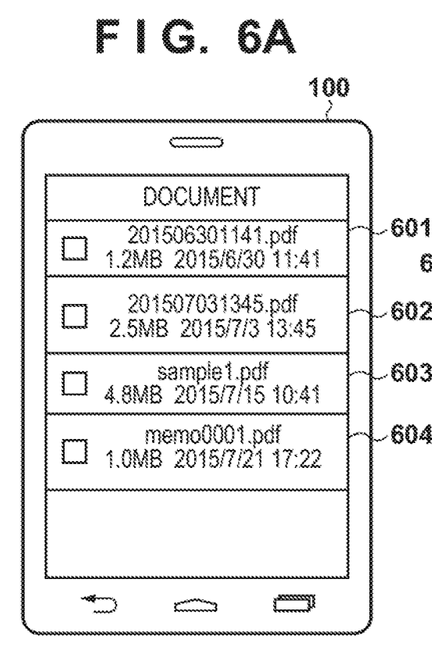
FIGS. 6A to 6C depict views each showing a screen example displayed on an operation panel by a print application of the mobile terminal according to the first embodiment.

FIG. 6A depicts a view showing an example of a print screen displayed on the mobile terminal 100 according to the first embodiment.

In FIG. 6A, a list of documents stored in the flash memory 204 is displayed. FIG. 6A shows the print screen on which four documents 601 to 604 are displayed. On this print screen, the user selects a document to be printed.

Figure 6B:
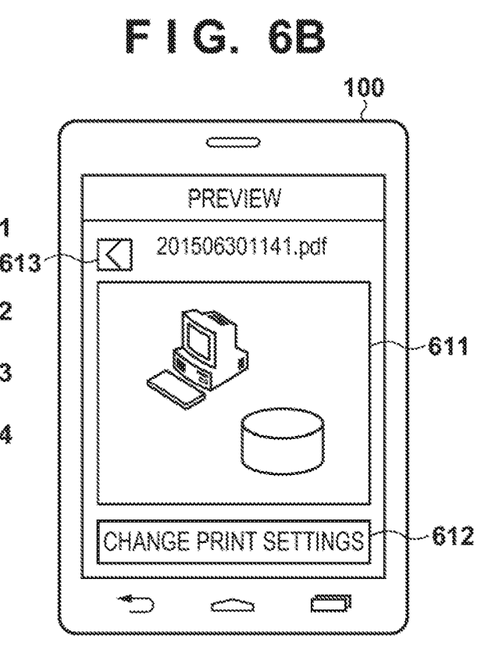
Figure 6C:
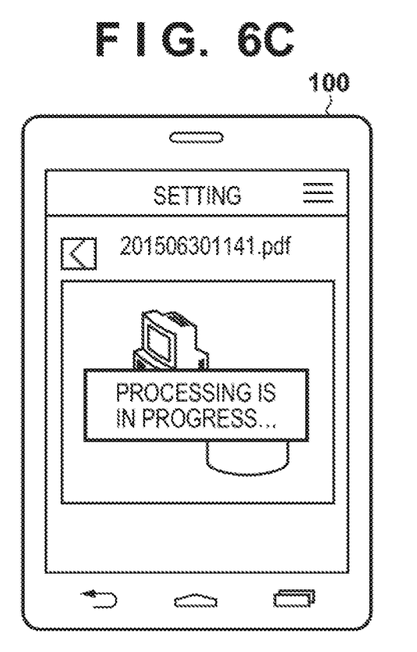

FIG. 6B depicts a view showing a print screen displayed when the user selects the document 601 on the print screen shown in FIG. 6A. On this print screen, a preview image 611 of the document 601 selected by the user is displayed. In this state, if the user wants to change print settings, he/she selects a button 612. Alternatively, if the user wants to return to the document list screen of FIG. 6A, he/she selects an icon 613.

While the print screen of FIG. 6B is displayed, if the user brings the mobile terminal 100 closer to the NFC tag 111 of the printing apparatus 110 (touches the NFC tag 111 with the mobile terminal 100), the near field wireless communication unit 210 reads the connection information stored in the NFC tag 111 of the printing apparatus 110. In the first embodiment, the NFC tag 111 of the printing apparatus 110 stores the connection information to be used by the wireless communication unit 211 to execute wireless communication with the printing apparatus 110. Based on the connection information obtained when the near field wireless communication unit 210 reads the NFC tag 111 of the printing apparatus 110, the wireless communication unit 211 can execute wireless communication with the printing apparatus 110.

When the wireless communication unit 211 of the mobile terminal 100 is connected to the access point (the access point 120 or printing apparatus 110) indicated by the connection information, the print application 300 generates a print job, and transmits it to the printing apparatus 110. The connection information obtained by the wireless communication unit 211 using near field wireless communication includes the IP address of the printing apparatus 110, and the print job is transmitted to the printing apparatus 110 by setting the IP address as a destination.

FIG. 6C depicts a view showing a screen example displayed on the operation panel 206 while the print application 300 transmits the print job. In FIG. 6C, a message "processing is in progress" indicating that the print job is currently transmitted is displayed. Upon completion of the transmission of the print job, the message indicating that the processing is in progress is erased.

The sequence of the print function implemented by the print application 300 has been described. This print function is implemented when the user touches the NFC tag 111 of the printing apparatus 110 with the mobile terminal 100, and is thus called a touch print function.

Figure 4:
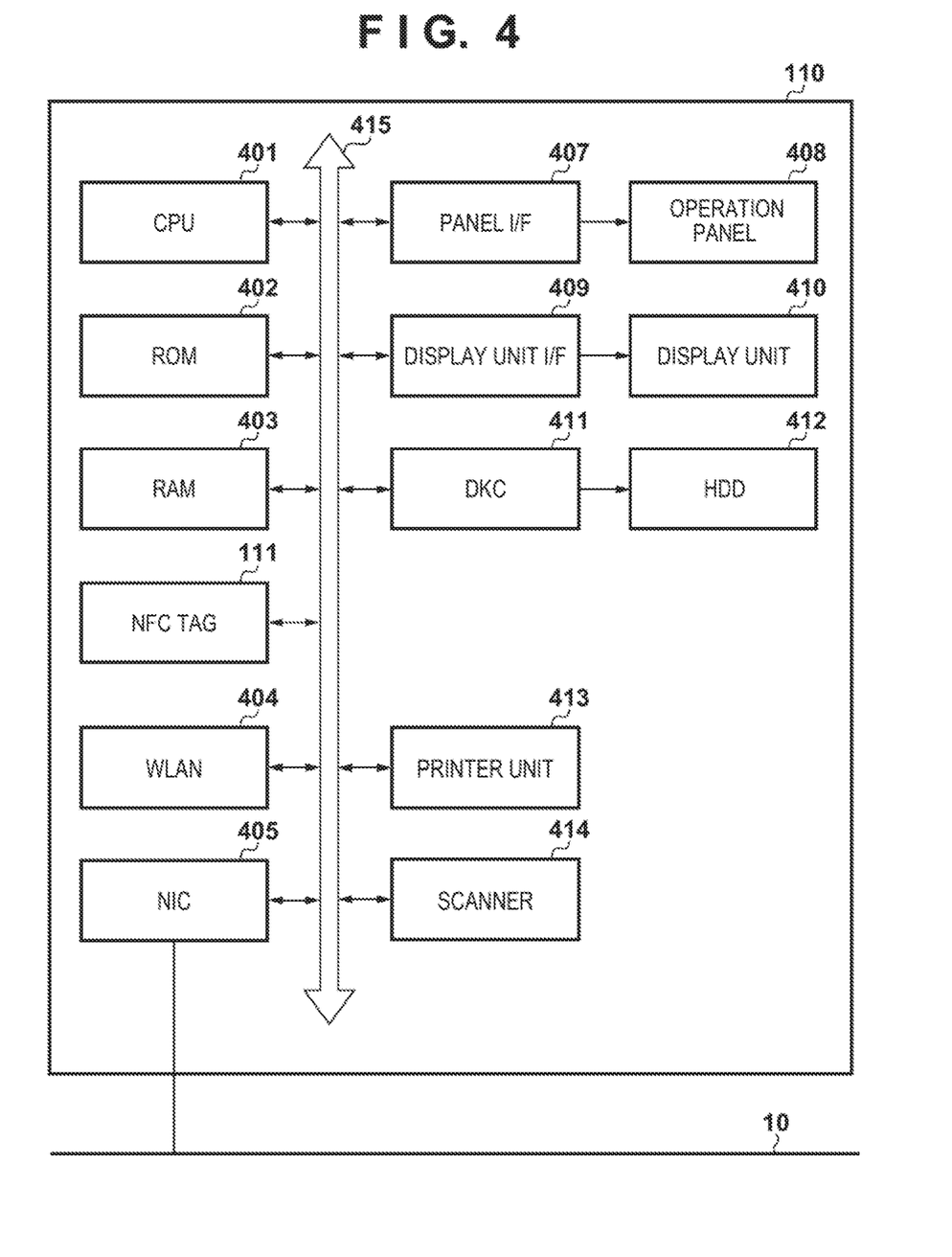
FIG. 4 is a block diagram for explaining the hardware arrangement of a printing apparatus according to the first embodiment.

FIG. 4 is a block diagram for explaining the hardware arrangement of the printing apparatus 110 according to the first embodiment. Note that the printing apparatus 110 will be explained by exemplifying a multi-function peripheral (MFP) having a copy function, a scan function, a print function, a box function, a facsimile transmission/reception function, and the like. However, a single-function printing apparatus may be used, as a matter of course.

A CPU 401 deploys, in a RAM 403, a program stored in a ROM 402 or a mass storage device such as a hard disk (HDD) 412, and executes the program, thereby comprehensively controlling respective devices connected to a system bus 415. The RAM 403 functions as a main memory, a work area, and the like for the CPU 401. A panel interface 407 inputs instructions from various buttons, an operation panel 408, and the like included in the printing apparatus 110. A display unit interface 409 controls a display on a display unit 410. A disk controller (DKC) 411 controls processing of reading/writing data from/in the mass storage device such as the HDD 412.

A network interface card (NIC) 405 bidirectionally exchanges data with another network apparatus, a file server, or the like via a network 10. In an operation in an infrastructure mode, a wireless communication unit (WLAN) 404 is connected to the network 10 via the access point to bidirectionally exchange data with another network apparatus, a file server, or the like. In an operation in a software AP mode, the printing apparatus 110 can operate as an access point to perform direct wireless communication connection to the mobile terminal. A printer unit 413 prints an image on a sheet such as paper by, for example, an electrophotographic method. A scanner 414 reads an original, and generates image data of an image of the original. As described above, the NFC tag 111 records the information of an application activated from the controller 702, a wireless LAN handover, and the like. The mobile terminal 100 loads the connection information stored in the NFC tag and the like using the near field wireless communication unit 210.

Figure 5:
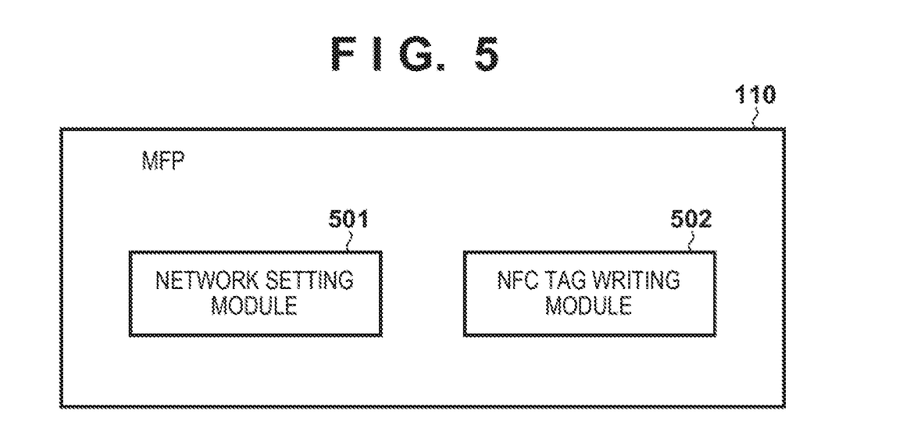
FIG. 5 is a block diagram for explaining the software arrangement of the printing apparatus according to the first embodiment.

FIG. 5 is a block diagram showing the software arrangement of the printing apparatus 110 according to the embodiment. Note that the software is stored in the ROM 402 or HDD 412. When the CPU 401 deploys the software in the RAM 403 and executes it, functions shown in the block diagram are implemented.

A network setting module 501 sets information to be written in the NFC tag 111. More specifically, the network setting module 501 sets, as parameters, wireless LAN connection information and information such as a device name. The wireless LAN connection information includes an SSID and a password. An SSID is randomly generated every time a wireless LAN is disconnected. An NFC tag writing module 502 writes, in the NFC tag 111, the parameters set by the network setting module 501.

Figure 8:
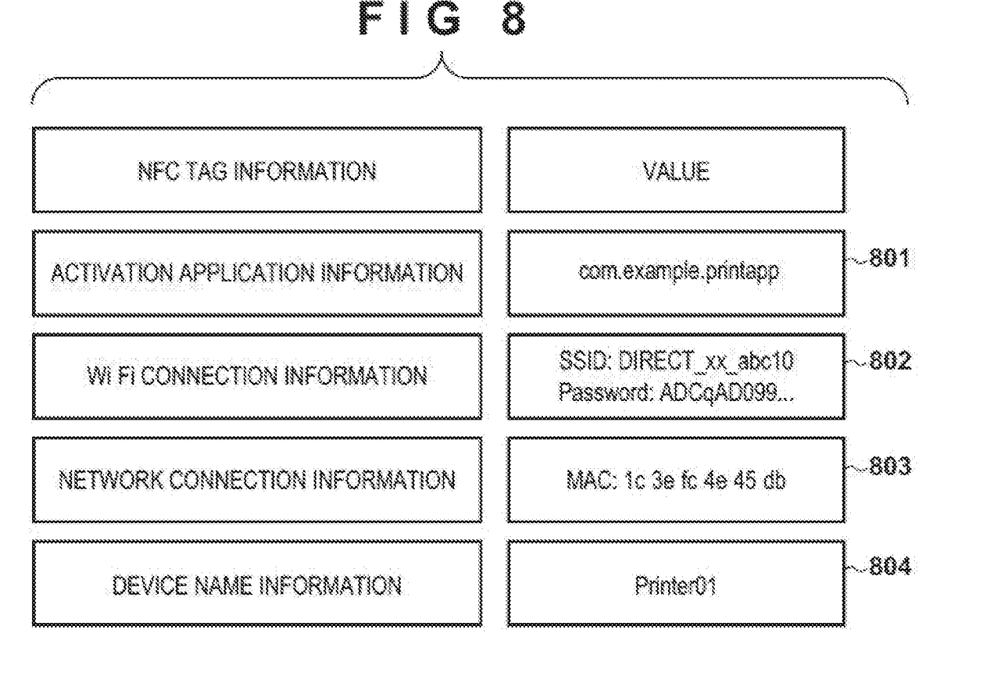
FIG. 8 depicts a view showing an example of information written in the NFC tag according to the first embodiment.

FIG. 8 depicts a view showing an example of information written in the NFC tag 111 according to the first embodiment.

Activation application information 801 indicates the name of an application activated when the NFC tag 111 is touched with the mobile terminal 100. Referring to FIG. 8, a print application having a name "com.example.printapp" is activated.

Wi-Fi connection information 802 indicates connection information to a wireless network. This connection information includes the SSID and password of the access point 120 connectable to the printing apparatus 110. A randomly generated temporary SSID is stored in a predetermined format. In the first embodiment, "DIRECT_xx_abc10" is stored, and a portion "xx" is randomly generated.

Network connection information 803 indicates the MAC address of the printing apparatus 110. In the first embodiment, only the MAC address is described. However, a combination of pieces of information capable of identifying the printing apparatus 110, such as the IP address and UUID of the printing apparatus 110, may be used.

Device name information 804 indicates the name of the printing apparatus 110, in this example, "Printer01".

Figure 9:
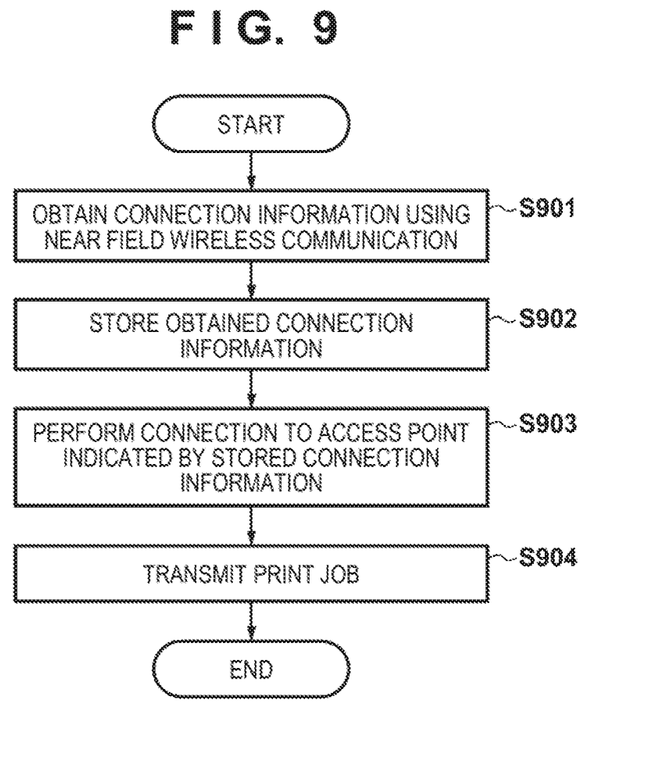
FIG. 9 is a flowchart for describing processing when the mobile terminal transmits a print job to the printing apparatus according to the first embodiment.

FIG. 9 is a flowchart for describing processing when the mobile terminal 100 transmits a print job to the printing apparatus 110 according to the first embodiment. The processing shown in this flowchart is implemented when the CPU 201 deploys, in the RAM 203, the program stored in the ROM 202 or the flash memory 204, and executes it.

This processing starts when the user of the mobile terminal 100 touches the NFC tag 111 of the printing apparatus 110 with the mobile terminal 100 while, for example, a document to be printed is selected on the screen of FIG. 6A.

In step S901, the CPU 201 obtains the connection information from the NFC tag 111 via the near field wireless communication unit 210. This connection information includes the SSID which has been temporarily generated by the printing apparatus 110 to perform direct wireless communication between the mobile terminal 100 and the printing apparatus 110. If the connection information is obtained from the NFC tag 111 via the near field wireless communication unit 210, the process advances to step S902 and the CPU 201 stores the obtained connection information in the flash memory 204. Next, the process advances to step S903 and the CPU 201 performs connection to the access point 120 indicated by the connection information stored in step S902. Thus, wireless communication between the mobile terminal 100 and the printing apparatus 110 is established. The process then advances to step S904 and the CPU 201 transmits a print job to the printing apparatus 110. In the first embodiment, the print application 300 generates a print job to print the document selected by the user on the print screen of FIG. 6A, and the generated print job is transmitted to the printing apparatus 110 in step S904. Upon receiving the print job transmitted in step S904, the printing apparatus 110 executes print processing based on the received print job. Upon completion of the transmission of the print job, end processing of the application is executed.

The mobile terminal 100 according to the first embodiment searches for an access point around itself at the time of wireless LAN connection, and displays an access point selection screen based on the search result. When the user selects a desired access point on the selection screen, the mobile terminal 100 is connected to the selected access point. Note that designation of an access point as a connection destination is not limited to designation from the selection screen based on the search result. For example, the user may directly input the SSID and connection key of an access point to the mobile terminal 100.

A storage module 312 (FIG. 3) of the OS 310 stores the connection information connected when the wireless communication unit 211 executes wireless communication. More specifically, as the connection information, the information of the access point selected on the selection screen or the information of the access point obtained by the near field wireless communication unit 210 from the NFC tag 111 by near field wireless communication is stored.

The mobile terminal 100 holds history information connected to a wireless LAN, and displays, on a history screen, a list of access points connected in the past. The history screen is displayed based on the information stored in the storage module 312.

The connection information obtained from the NFC tag by near field wireless communication is information to be temporarily used to execute printing. If the storage module 312 stores the connection information to be temporarily used every time the print application 300 executes the touch print function, a large amount of connection information is stored in the storage module 312. If a large amount of connection information to be temporarily used is stored in the storage module 312, for example, a large amount of information is displayed on the history screen, resulting in poor appearance.

Furthermore, the number of pieces of connection information stored in the storage module 312 may reach the maximum number of pieces of connection information which can be stored in the storage module 312. In this case, if connection information obtained from the NFC tag by near field wireless communication is newly stored, other important connection information, for example, connection information indicating an access point used by the user at home may be deleted, thereby degrading the user convenience.

To cope with this, in the first embodiment, the connection information obtained from the NFC tag by the near field wireless communication, that is, the connection information to be temporarily used is deleted. This processing can prevent the appearance of the history screen from becoming poor and prevent important connection information from being deleted due to an increase in the stored connection information.

Figure 10:
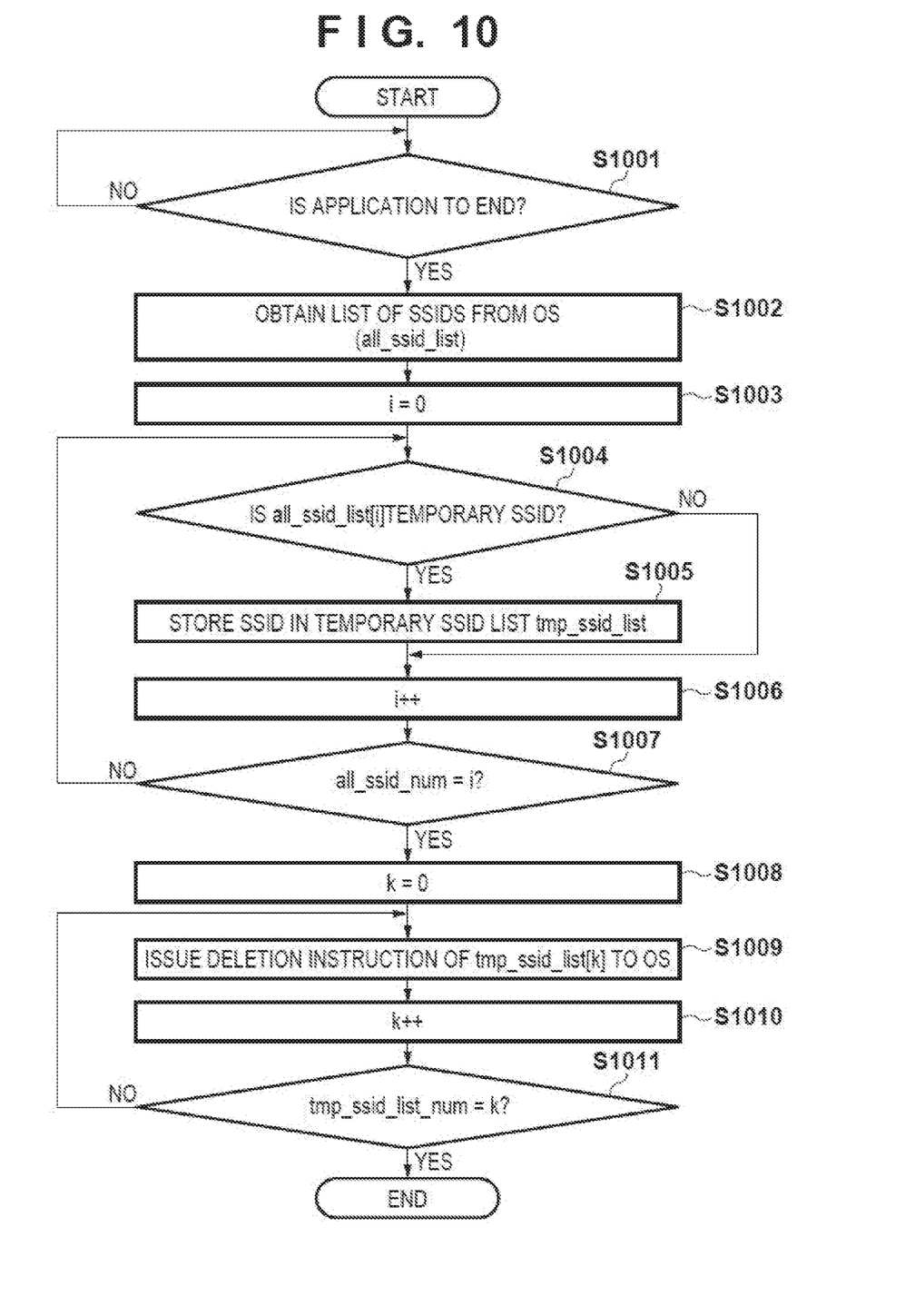
FIG. 10 is a flowchart for describing processing executed to end the print application of the mobile terminal according to the first embodiment.

FIG. 10 is a flowchart for describing processing executed to end the print application 300 of the mobile terminal 100 according to the first embodiment. The processing shown in this flowchart is implemented when the CPU 201 deploys, in the RAM 203, the program stored in the ROM 202 or the flash memory 204, and executes it.

At this time, all_SSID_list (element count: all_SSID_list_num) for storing a list of SSIDs obtained from the OS 310 and tmp_SSID_list (element count: tmp_SSID_list_num) for storing a list of temporarily connected SSIDs are provided as work areas in the RAM 203, and variables i and k each indicating the ordinal number of an element in the list are provided in the RAM 203.

In step S1001, the CPU 201 determines whether or not the application is to end. If the application is to end, the process advances to step S1002, otherwise, the process returns to step S1001. In step S1002, the CPU 201 obtains a list of SSIDs from the OS 310, and stores it in the SSID list all_SSID_list in the RAM 203. The process advances to step S1003, and the CPU 201 initializes the variable i in the RAM 203 to "0", and the process advances to step S1004. In step S1004, the CPU 201 determines whether or not the ith SSID in the SSID list all_SSID_list is a temporary SSID. In the first embodiment, if the name of the SSID includes a predetermined character string, it is determined that the SSID is a temporary SSID. Note that a temporary SSID determination method is not limited to this. For example, if a specific IP address is indicated, it may be determined that the SSID is a temporary SSID. Alternatively, determination may be performed based on a flag included in information obtained by the near field wireless communication such as NFC or Bluetooth. Other determination methods may be adopted.

If the CPU 201 determines in step S1004 that the SSID is a temporary SSID, the process advances to step S1005, otherwise, the process advances to step S1006. In step S1005, the CPU 201 stores the SSID determined as the temporary SSID in tmp_SSID_list for storing the list of temporarily connected SSIDs, and the process advances to step S1006. In step S1006, the CPU 201 increments the variable i, and the process advances to step S1007. In step S1007, the CPU 201 determines whether or not the element count (all_SSID_list_num) of all_SSID_list is equal to the variable i. That is, it is determined whether or not all the elements of the SSID list obtained in step S1002 have been checked. If it is determined that the element count is equal to the variable i, that is, all the elements have been checked, the process advances to step S1008, otherwise, the process returns to step S1004.

In step S1008, the CPU 201 initializes, to "0", the variable k for counting the number of deleted elements, and the process advances to step S1009. In step S1009, the CPU 201 issues a deletion instruction of tmp_SSID_list[k] to the OS 310, and the process advances to step S1010. In step S1010, the CPU 201 increments the variable k, and the process advances to step S1011. In step S1011, the CPU 201 determines whether or not tmp_SSID_list_num is equal to the variable k. That is, it is determined whether or not the CPU 201 has issued, to the OS 310, deletion instructions of all the elements of the temporary SSID list tmp_SSID_list. If the CPU 201 has not issued deletion instructions of all the elements, the process returns to step S1009, otherwise, the process ends.

Note that in the first embodiment, all the SSIDs determined as the temporary SSIDs are deleted. However, in consideration of the processing load of the OS, only a predetermined number (for example, 5) of temporary SSIDs may be deleted instead of deleting all the temporary SSIDs at a time. The user may instruct the predetermined number.

As described above, according to the first embodiment, by deleting SSIDs determined as the temporary SSIDs, for example, it is possible to prevent the appearance of the history screen from becoming poor and prevent important connection information from being deleted due to an increase in stored connection information.

Note that in the first embodiment, the deletion processing of the connection information is executed at the end of the application. However, for example, temporary connection information may be deleted at the time of activation of the application, at the time of new connection, or at the time of disconnection.

Second Embodiment

The second embodiment of the present invention will be described next. In the second embodiment, in addition to the above-described arrangement, an SSID currently used is considered as connection information which is still used by the user, and is not deleted. This processing will be described in detail below. Note that a system configuration and the hardware arrangements of a mobile terminal 100 and a printing apparatus 110 according to the second embodiment are the same as those in the above-described first embodiment and a description thereof will be omitted.

Figure 11A:
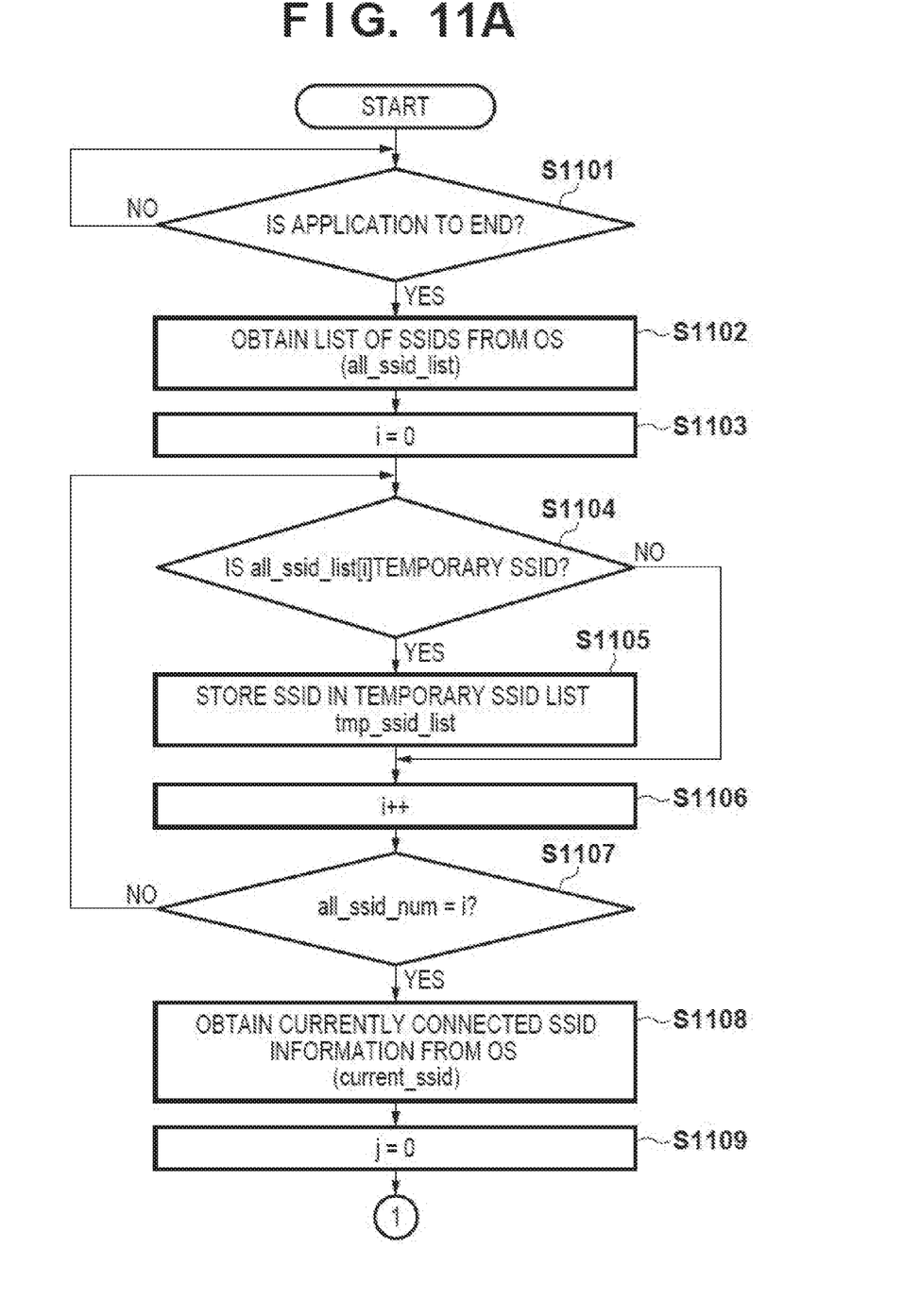
FIGS. 11A and 11B are flowcharts for describing processing executed when a print application of a mobile terminal ends according to a second embodiment.
Figure 11B:
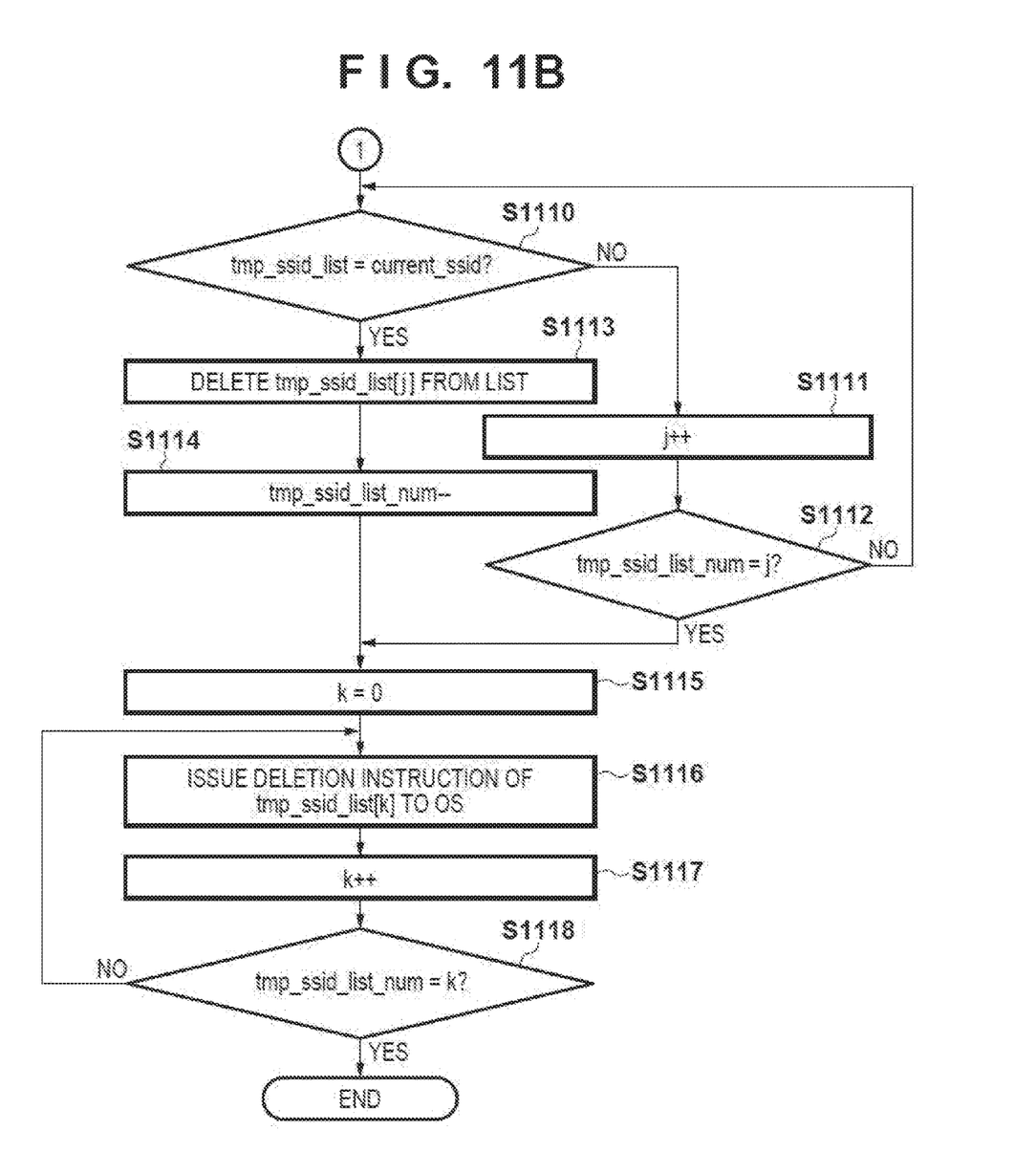

FIGS. 11A and 11B are flowcharts for describing processing executed when a print application 300 of the mobile terminal 100 ends according to the second embodiment. The processing shown in this flowchart is implemented when a CPU 201 deploys, in a RAM 203, a program stored in a ROM 202 or a flash memory 204, and executes it.

At this time, all_SSID_list (element count: all_SSID_list_num) for storing a list of SSIDs obtained from an OS 310 and current_SSID for holding currently connected SSID information are provided as work areas in the RAM 203. Furthermore, tmp_SSID_list (element count: tmp_SSID_list_num) for storing a list of temporarily connected SSIDs and variables i, j, and k each indicating the ordinal number of an element in the list are provided in the RAM 203.

In step S1101, the CPU 201 determines whether or not the application is to end. If the application is to end, the process advances to step S1102, otherwise, the process returns to step S1101. In step S1102, the CPU 201 obtains a list of SSIDs from the OS 310, and stores it in all_SSID_list in the RAM 203. The process advances to step S1103, and the CPU 201 initializes the variable i in the RAM 203 to "0", and the process advances to step S1104. In step S1104, the CPU 201 determines whether or not the ith SSID in all_SSID_list is a temporary SSID. In the second embodiment, if the name of the SSID includes a predetermined character string, it is determined that the SSID is the temporary SSID. Note that a temporary SSID determination method is not limited to this. For example, if a specific IP address is indicated, it may be determined that the SSID is the temporary SSID. Alternatively, determination may be performed based on a flag included in information obtained by near field wireless communication such as NFC or Bluetooth. Other determination methods may be adopted.

If the CPU 201 determines in step S1104 that the SSID is the temporary SSID, the process advances to step S1105, otherwise, the process advances to step S1106. In step S1105, the CPU 201 stores the SSID determined as the temporary SSID in tmp_SSID_list for storing the list of temporarily connected SSIDs, and the process advances to step S1106. In step S1106, the CPU 201 increments the variable i, and the process advances to step S1107. In step S1107, the CPU 201 determines whether or not the element count (all_SSID_list_num) of all_SSID_list is equal to the variable i. That is, it is determined whether or not all the elements of the SSID list obtained in step S1102 have been checked. If it is determined that the element count is equal to the variable i, that is, all the elements have been checked, the process advances to step S1108, otherwise, the process returns to step S1104.

In step S1108, the CPU 201 obtains a currently connected SSID from the OS 310, and stores it in current_SSID. Then, the process advances to step S1109. In step S1109, the CPU 201 initializes the variable j, and the process advances to step S1110 (FIG. 11B). In step S1110, the CPU 201 determines whether or not tmp_SSID_list[j] matches the current_SSID. That is, it is determined whether or not the SSID determined as the temporary SSID matches the currently connected SSID. If it is determined that the SSIDs match, the process advances to step S1113, otherwise, the process advances to step S1111. In step S1111, the CPU 201 increments the variable j. The process advances to step S1112, and the CPU 201 determines whether or not tmp_SSID_list_num is equal to the variable j. That is, it is determined whether or not all the elements of the list of temporarily connected SSIDs have been checked. If it is determined that tmp_SSID_list_num is equal to the variable j, that is, all the elements have been checked, the process advances to step S1115, otherwise, the process returns to step S1110.

In step S1113, the CPU 201 deletes the currently connected SSID from the temporary SSID list tmp_SSID_list[j], and the process advances to step S1114. Since one element tmp_SSID_list[j] of the temporary SSID list has been deleted, the CPU 201 decrements (−1) tmp_SSID_list_num in step S1114, and the process advances to step S1115.

In step S1115, the CPU 201 initializes the variable k, and the process advances to step S1116. In step S1116, the CPU 201 issues a deletion instruction of tmp_SSID_list[k] to the OS 310, and the process advances to step S1117. In step S1117, the CPU 201 increments the variable k, and the process advances to step S1118. In step S1118, the CPU 201 determines whether or not tmp_SSID_list_num is equal to the variable k. That is, it is determined whether or not the CPU 201 has issued, to the OS 310, deletion instructions of all the elements of the temporary SSID list tmp_SSID_list after the currently connected SSID is deleted. If it is determined that the CPU 201 has not issued the deletion instructions of all the elements, the process returns to step S1116, otherwise, the process ends.

Note that in the second embodiment, all the temporary SSIDs except for the currently used SSID are deleted. However, in consideration of the processing load of the OS 310, only a predetermined number (for example, 5) of temporary SSIDs may be deleted instead of deleting all the temporary SSIDs at one time. The user may designate the predetermined number via, for example, an operation panel 206.

As described above, according to the second embodiment, by deleting SSIDs determined as temporary SSIDs, for example, it is possible to prevent the appearance of a history screen from becoming poor and prevent important connection information from being deleted due to an increase in stored connection information. Furthermore, by deleting the SSIDs except for the currently used SSIDs, it is possible to leave connection information which is still used by the user.

Note that in the second embodiment, the temporary connection information deletion processing is executed at the end of the application. However, the deletion processing of the temporary connection information may be executed at the time of activation of the application, at the time of new connection, or at the time of disconnection.

Note that in the first and second embodiments, an SSID starting with a predetermined character string (for example, "Direct") is used as a condition for determining a temporary SSID. However, for example, if the fixed SSID of a given product includes the predetermined character string, this SSID is unwantedly determined as a temporary SSID in this embodiment. To cope with this, a predetermined condition such as the format of an SSID or a specific IP address may be used as a condition for determining a temporary SSID. Alternatively, as described above, the condition may be that information obtained by near field wireless communication such as NFC or Bluetooth is included.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-158500, filed Aug. 10, 2015 which is hereby incorporated by reference herein in its entirety.

What is claimed is:

1. A method that is executed by an application program in an information processing apparatus, wherein an OS (Operating System) of the information processing apparatus automatically stores information indicating SSIDs (Service Set Identifiers) used when the information processing apparatus executes wireless communication, and wherein the method comprises:

wirelessly transmitting data to an external apparatus via an access point;

obtaining, from the OS of the information processing apparatus, the information indicating SSIDs of access points being stored in the information processing apparatus;

specifying, based on the obtained information indicating the SSIDs, temporary SSIDs among the SSIDs indicated by the obtained information;

obtaining, from the OS of the information processing apparatus, a currently connected SSID to which the information processing apparatus currently connects; and instructing, when a predetermined process is executed for the application program, the OS of the information processing apparatus to delete, from the SSIDs being stored in the information processing apparatus, a predetermined number of the specified temporary SSIDs other than the obtained currently connected SSID, wherein the predetermined number is more than one, and wherein the predetermined number is determined in advance without regard to a total number of the SSIDs being stored in the information processing apparatus.

2. The method according to claim 1, wherein the temporary SSIDs are specified based on a character string included in each of the SSIDs.

3. The method according to claim 2, wherein the character string of each of the specified temporary SSIDs includes a predetermined character string.

4. The method according to claim 1, wherein the detection of the predetermined number of the specified temporary SSIDs other than the obtained currently connected SSID is instructed when an ending process of the application program is executed as the predetermined process after the application program transmits the data to the external apparatus via the access point indicated by the currently connected SSID.

5. An information processing apparatus, wherein an OS (Operating System) of the information processing apparatus automatically stores information indicating SSIDs (Service Set Identifiers) used when the information processing apparatus executes wireless communication, the apparatus comprising:
    a memory that stores an application program; and
    a processor that executes the application program to:
        wirelessly transmit data to an external apparatus via an access point;
        obtain, from the OS of the information processing apparatus, information indicating SSIDs of access points being stored in the information processing apparatus;
        specify, based on the obtained information indicating the SSIDs, temporary SSIDs among the SSIDs indicated by the obtained information;
        obtain, from the OS of the information processing apparatus, a currently connected SSID to which the information processing apparatus currently connects; and
        instruct, when a predetermined process is executed for the application program, the OS of the information processing apparatus to delete, from the SSIDs being stored in the information processing apparatus, a predetermined number of the specified temporary SSIDs other than the obtained currently connected SSID, wherein the predetermined number is more than one, and wherein the predetermined number is determined in advance without regard to a total number of the SSIDs being stored in the information processing apparatus.

6. The information processing apparatus according to claim 5, wherein the temporary SSIDs are specified based on a character string included in each of the SSIDs.

7. The information processing apparatus according to claim 6, wherein the character string of each of the specified temporary SSIDs includes a predetermined character string.

8. The information processing apparatus according to claim 5, wherein the processor instructs the OS to delete, from the SSIDs being stored in the information processing apparatus, the predetermined number of the specified temporary SSIDs other than the obtained currently connected SSID when an ending process of the application program is executed as the predetermined process after the application program transmits the data to the external apparatus via the access point indicated by the currently connected SSID.

9. A non-transitory computer-readable storage medium storing an application program executed by a processor of an information processing apparatus, wherein an OS (Operating System) of the information processing apparatus automatically stores information indicating SSIDs (Service Set Identifiers) used when the information processing apparatus executes wireless communication, and wherein, when executed by the processor of the information processing apparatus, the application program causes the processor to execute:
    wirelessly transmitting data to an external apparatus via an access point;
    obtaining, from the OS of the information processing apparatus, the information indicating SSIDs of access points being stored in the information processing apparatus;
    specifying, based on the obtained information indicating the SSIDs, temporary SSIDs among the SSIDs indicated by the obtained information;
    obtaining, from the OS of the information processing apparatus, a currently connected SSID to which the information processing apparatus currently connects; and
    instructing, when a predetermined process is executed for the application program, the OS of the information processing apparatus to delete, from the SSIDs being stored in the information processing apparatus, a predetermined number of the specified temporary SSIDs other than the obtained currently connected SSID, wherein the predetermined number is more than one, and wherein the predetermined number is determined in advance without regard to a total number of the SSIDs being stored in the information processing apparatus.

10. A non-transitory computer-readable storage medium storing an application program executed by a processor of an information processing apparatus, wherein an OS (Operating System) of the information processing apparatus automatically stores information indicating SSIDs (Service Set Identifiers) used when the information processing apparatus executes wireless communication, and wherein, when executed by the processor of the information processing apparatus, the application program causes the processor to execute:
    wirelessly transmitting data to an external apparatus via an access point;
    obtaining, from the OS of the information processing apparatus, the information indicating SSIDs of access points being stored in the information processing apparatus;
    specifying, based on the obtained information indicating the SSIDs, a predetermined number of temporary SSIDs among the SSIDs indicated by the obtained information; and
    instructing, when a predetermined process is executed for the application program, the OS of the information processing apparatus to delete the specified predetermined number of temporary SSIDs from the SSIDs being stored in the information processing apparatus, wherein the predetermined number is more than one, and wherein the predetermined number is determined in advance without regard to a total number of the SSIDs being stored in the information processing apparatus.

* * * * *